(No Model.)
G. W. PARMLEY.
MEANS FOR SUPPORTING AND HANDLING POTTED PLANTS.
No. 559,200. Patented Apr. 28, 1896.
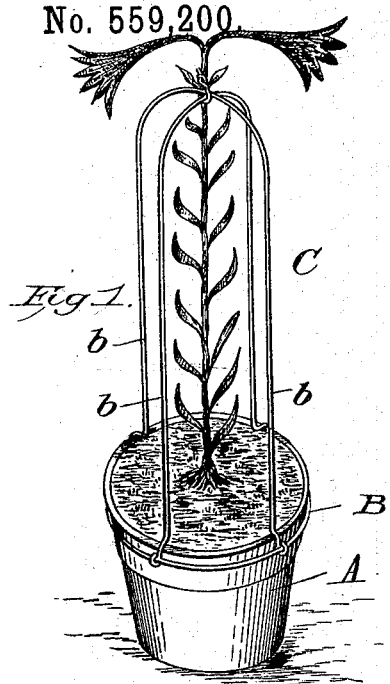
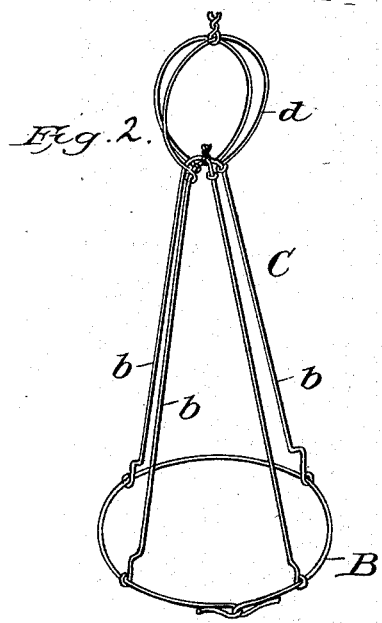
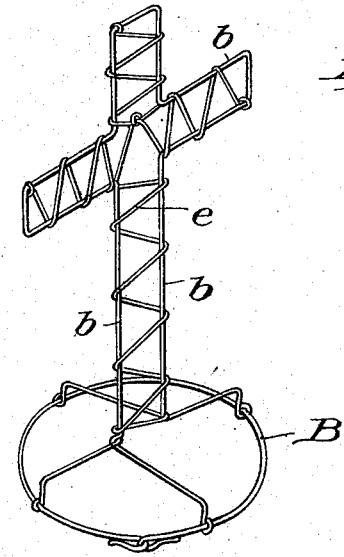
WITNESSES
F. L. Ouraud
Jos. Gregory
INVENTOR.
George W. Parmley.
Per R. A. Morrison Attorney.

UNITED STATES PATENT OFFICE.

GEORGE W. PARMLEY, OF SHAMOKIN, PENNSYLVANIA.

MEANS FOR SUPPORTING AND HANDLING POTTED PLANTS.

SPECIFICATION forming part of Letters Patent No. 559,200, dated April 28, 1896.

Application filed January 15, 1895. Serial No. 535,004. (No model.)

*To all whom it may concern:*

Be it known that I, GEORGE W. PARMLEY, a citizen of the United States, residing at Shamokin, in the county of Northumberland and State of Pennsylvania, have invented certain new and useful Improvements in Means for Supporting and Handling Potted Plants; and I do hereby declare the following to be a full, clear, and exact description of the invention, such as will enable others skilled in the art to which it appertains to make and use the same.

My invention relates to means for supporting and handling potted plants.

I attain my object by the device illustrated in the accompanying drawings, in which—

Figure 1 is a perspective view showing my flower-support applied to a potted plant. Fig. 2 is a like view of still another form of my support having an adjustable top. Fig. 3 is a like view showing one of the many forms which the support may be made to assume whereby the plant may be made to take any desired shape or figure.

The present method of securing and supporting plants in position by means of stakes driven into the soil is objectionable for the reason that the roots of the plants are often injured thereby, while the stakes become loose or rot in the soil, and in any event present an unsightly appearance and frequently fail of accomplishing the desired result.

In carrying out my invention I form a wire loop or ring B around the top of the pot or receptacle A containing the plant, and to this ring a main wire support or frame C is attached in any suitable manner, being connected thereto at as many points as may be desired, the ring B and main or body frame C together constituting the entire frame. This frame C is composed of wires $b$, extends above the containing vessel, and is easily grasped by the hand. In this way a handle is formed by which the potted plants are easily, readily, and safely handled. If desired, the frame may be constructed with a sliding extension $d$, as seen in Fig. 2, the extension part being looped onto the wires $b$, and may be used as a handle for the device or to adjust the height of the support to the growing plant, the extension being raised as the plant grows.

The ring B can be placed around the top of the pot and the frame can then be secured to the ring at any stage of the plant's growth or, if preferred, before planting, or the ends of the wire ring B can be inserted in the loops or eyes formed on the ends of the wires $b$ which constitute the main part of the frame. When this is done, the ends of the wire ring can be grasped with pincers and brought tightly around the upper end of the pot and fastened with a twist. The tightened ring prevents the pots from breaking, and even if broken will retain the parts in place.

It is well known by florists and those handling potted plants that the rim of the pots is the part most liable to break. This is prevented by locating and constricting the ring in the manner set forth.

It will readily be seen that by my method a single person can handle a large number of plants with greater facility and safety than by the old process, whether the plants be for transportation or for the greenhouse or for setting them out in springtime. They can also be tied up in paper to protect the bloom for shipping in cold weather.

The frame can be made in any desired shape, so that the vines or flowers can be trained to form the most artistic designs or the initial letter of any name, or even the full name itself. In Fig. 3 one design is shown in the form of a cross. In this manner they may be used as decorations for rooms or for exhibition or for cemetery or church or other purposes.

It is not necessary to enumerate all the forms or designs which the flowers or vines may be made to assume when growing. These will be determined by the purpose which they are intended to serve and will fall within the scope of my invention.

I claim—

1. The combination of a pot and a frame consisting of a ring encircling the top of the pot and substantially vertical wires attached thereto and united at their tops and an extension-piece attached to said vertical wires, substantially as shown.

2. The combination of a pot and a frame consisting of a ring encircling the top of the pot and substantially vertical wires attached thereto and united at their tops and an adjustable extension-piece looped around said vertical wires and sliding thereon, as set forth.

In testimony whereof I affix my signature in presence of two witnesses.

GEORGE W. PARMLEY.

Witnesses:
WALTER W. DAUBERT,
P. F. IGO.